(12) United States Patent
Widder

(10) Patent No.: US 6,272,408 B1
(45) Date of Patent: Aug. 7, 2001

(54) METHOD AND ARRANGEMENT FOR TRANSMITTING DATA IN A MOTOR VEHICLE

(75) Inventor: Johannes Widder, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/209,832

(22) Filed: Dec. 11, 1998

(30) Foreign Application Priority Data

Dec. 12, 1997 (DE) .............................................. 197 55 311

(51) Int. Cl.$^7$ ......................................................... G06F 7/00
(52) U.S. Cl. ................................................. 701/29; 701/70

(58) Field of Search ..................................... 701/1, 29, 33, 701/35, 36, 70, 71, 76, 82, 91, 92; 340/534, 825.04; 307/9.1, 10.1

(56) References Cited

U.S. PATENT DOCUMENTS 5,558,178    9/1996   Hess et al. ............................ 180/197

*Primary Examiner*—William A. Cuchlinski, Jr.
*Assistant Examiner*—Edward Pipala
(74) *Attorney, Agent, or Firm*—Walter Ottesen

(57) ABSTRACT

The invention is directed to a method and an arrangement for transmitting data in a motor vehicle. At least two desired values are transmitted which cannot be present simultaneously. In addition, an additional piece of data is transmitted in the context of the message of the desired value which is not present.

26 Claims, 4 Drawing Sheets

METHOD AND ARRANGEMENT FOR TRANSMITTING DATA IN A MOTOR VEHICLE

BACKGROUND OF THE INVENTION

U.S. Pat. No. 5,558,178 discloses that data can be exchanged between various control units for controlling a motor vehicle. The data can be exchanged, for example, via a data bus such as CAN. In this patent, a control system for the drive unit of a motor vehicle is described to which, in specific operating states, input values for the torque of the drive unit are transmitted from at least one additional control unit. The at least one additional control unit defines at least one of the following: a control unit for carrying out a drive-slip control, a driving dynamic control, an electronic transmission control unit or a control unit for controlling the distance to a forward vehicle. The desired torque values, which are transmitted in this way, are converted by the motor control unit so that the torque of the drive unit approximates the externally supplied desired value in the above-mentioned operating states. The consistency or actuality of the transmitted data is then of special significance.

To monitor the actuality of the transmitted data, a message count is transmitted from the additional control unit at time points which changes regularly and the motor control unit checks the actuality of the transmitted data on the basis of this message count. To check consistency of the input values, plausibility checks are provided from which the correctness of the transmitted desired torque values can be derived with great probability.

SUMMARY OF THE INVENTION

It is an object of the invention to provide measures with which the monitoring of the data transmission as to actuality and/or consistency is made possible with the least complexity.

The method of the invention is for transmitting data in a motor vehicle having at least one control unit. The method includes the steps of: causing the control unit to transmit pieces of data in the context of a first message containing a first operating variable and a second message containing a second operating variable not present simultaneously with the first operating variable; and, causing the control unit to transmit an additional piece of data in the context of the second message.

The data are transmitted for checking the actuality and/or consistency of an active desired input. These data are transmitted in the context of a desired message which is not active. With this measure, additional messages and therefore memory capacity are saved. A precondition is that the two desired messages cannot be active at the same time.

The transmission of the message count for the actuality check and/or the transmission of a support value for the consistency check is especially advantageous in a non-active desired message.

Special advantages are afforded with respect to this procedure in connection with a drive-slip control (ASR) and a motor drag torque control (MSR) wherein respectively separate desired messages (which are never simultaneously active) are transmitted between the control unit, which computes the desired message, and the receiving motor control unit. The application in combination with a CAN interface between two control apparatus is especially advantageous.

The application for an interface is especially advantageous wherein two desired messages are transmitted for at least one of the functions to be carried out (for example, ASR and MSR). The message count and the consistency check value can then be transmitted simultaneously when the desired message of the other function is active.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
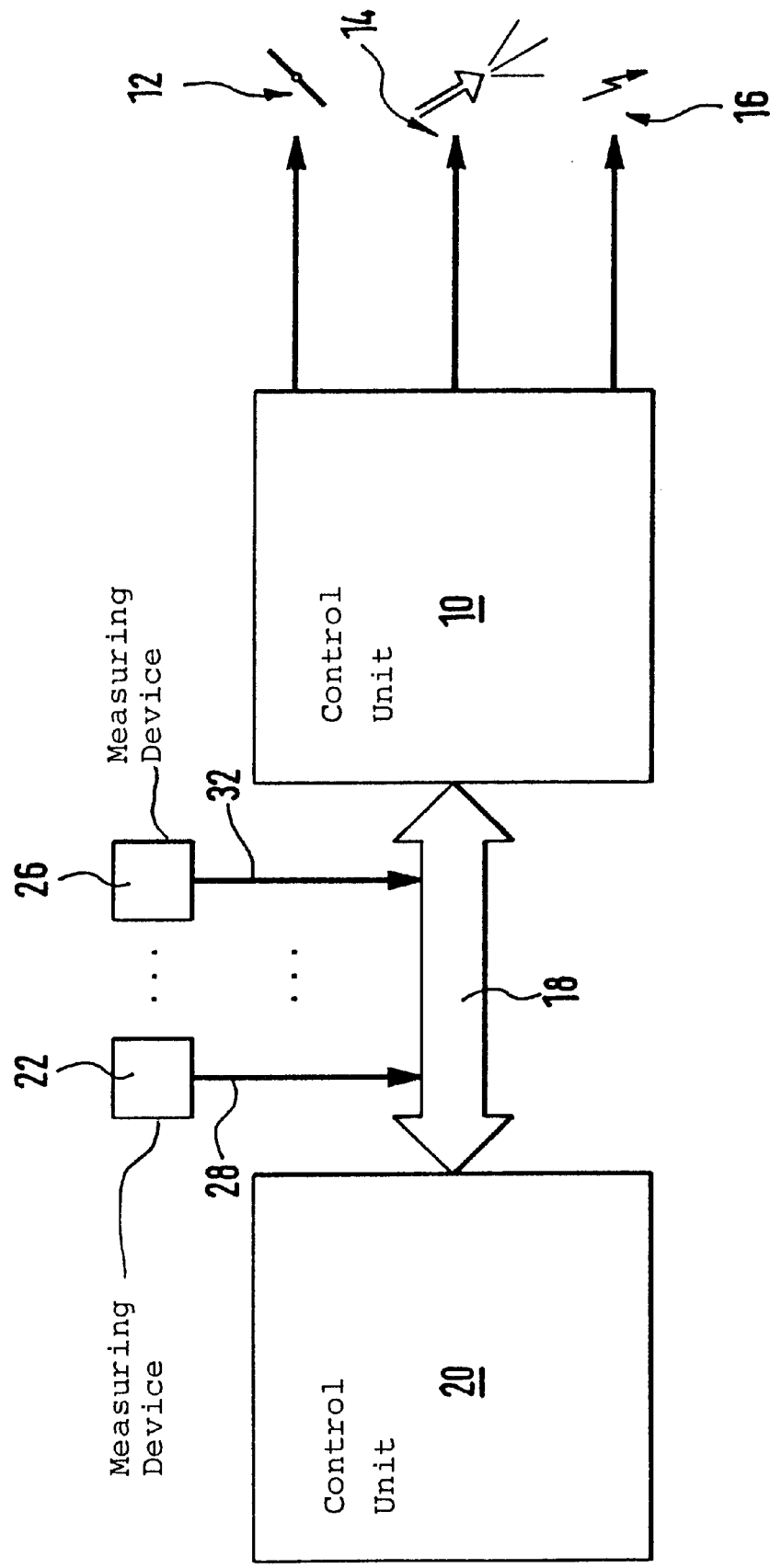
FIG. 1 is an overview block diagram of two control units which exchange information via a common data bus.

FIG. 1 shows a first control unit 10 which serves to control the torque of a drive unit of a motor vehicle. In the preferred embodiment, this drive unit is an internal combustion engine so that the control unit 10 influences the air supply to the engine via a throttle flap 12, the quantity of fuel 14 to be injected and the ignition angle 16 to be adjusted.

In another embodiment, the invention can relate to a diesel engine or to an electric drive.

The control unit 10 is connected via a communication bus 18 to at least one further control unit 20. The communication bus 18 can, for example, be a CAN bus. In the preferred embodiment, the control unit 20 defines a control unit with the aid of which a drive-slip control and a motor drag torque control (if required, in the context of a driving dynamic control) is carried out. In this context, the control unit 20 influences the brakes of the vehicle (not shown in FIG. 1) and outputs torque-reducing and torque-increasing desired inputs to the motor control unit. Furthermore, measuring devices 22 to 26 are provided which make their measurement signals available to the control units 10 or 20 via the measuring lines 28 to 32 and the communications bus 18. In another embodiment, the measuring devices 22 to 26 can make their measurement signals available directly. The operating variables made available in this manner include, for example, engine rpm, accelerator pedal position, wheel rpm, et cetera.

The solution provided by the invention is described below and is not only usable in connection with a control unit for carrying out an MSR function and an ASR function. Instead, the solution of the invention is usable anywhere where, in the context of two functions, desired values are transmitted to a motor control unit from another control unit and where the functions cannot be active simultaneously. An example here is a transmission control unit which, to control a shift operation, transmits one desired value for upshifting and another desired value for downshifting for influencing the motor. For example, where the motor is an internal combustion engine, the engine can be influenced by advancing or retarding the ignition to change the engine rpm when upshifting or downshifting. Furthermore, the solution of the invention is not limited to the example of the application of an internal combustion engine. The control unit 10 for controlling the drive unit can also control an electric motor, for example, serving as the drive unit.

In the following, an embodiment is described wherein desired values for the torque of the drive unit are transmitted. In other embodiments, other operating variables of the motor are transmitted as desired values, such as the power of the motor, the rpm, the load, et cetera. The above-described advantages are likewise achieved.

In the preferred embodiment, a CAN protocol is utilized as an interface. The messages are defined as known in the CAN protocol and stored for reading in into specific memory cells. The described procedure, however, is applicable for other bus systems where the above advantages are likewise achieved.

In addition to the spatially separated control unit, the procedure described can also be applied in combination with control units, which are integrated in one apparatus, or for the communication of various program modules.

The control unit 20 forms input values for the torque of the drive unit in the context of carrying out the ASR function (torque reducing) and the MSR function (torque increasing) when the corresponding function is active. Furthermore, data are transmitted which indicate to the receiving control unit 10 which of the two functions is active. In principle, both functions are not active at the same time so that only one active desired torque value is transmitted. This is utilized in order to transmit the message count, which serves a monitoring operation, in the context of the message of the non-active desired value. The message count is formed in the control unit 20 by incrementing or decrementing in pregiven intervals. The control unit 10 determines the non-active function from the data supplied thereto and recognizes the message count and checks the actuality of the desired torque value on the basis of the message count. The desired torque value is transmitted in the context of the other message.

In the preferred embodiment, two desired torque values are provided for the drive-slip control. One desired torque value is for the adjustment of the torque via the air supply and one is for the adjustment of the torque via the ignition angle and/or the fuel metering. In this case, it is provided that, for the non-active drive-slip control, the message count is transmitted in the context of the message affecting the air path. The other message is used to transmit a desired torque which is increased by the actual value of the message count for an active motor torque drag control. This desired torque is applied in the control unit 10 for checking consistency of the desired torque value in the context of the motor drag torque control.

Figure 2:
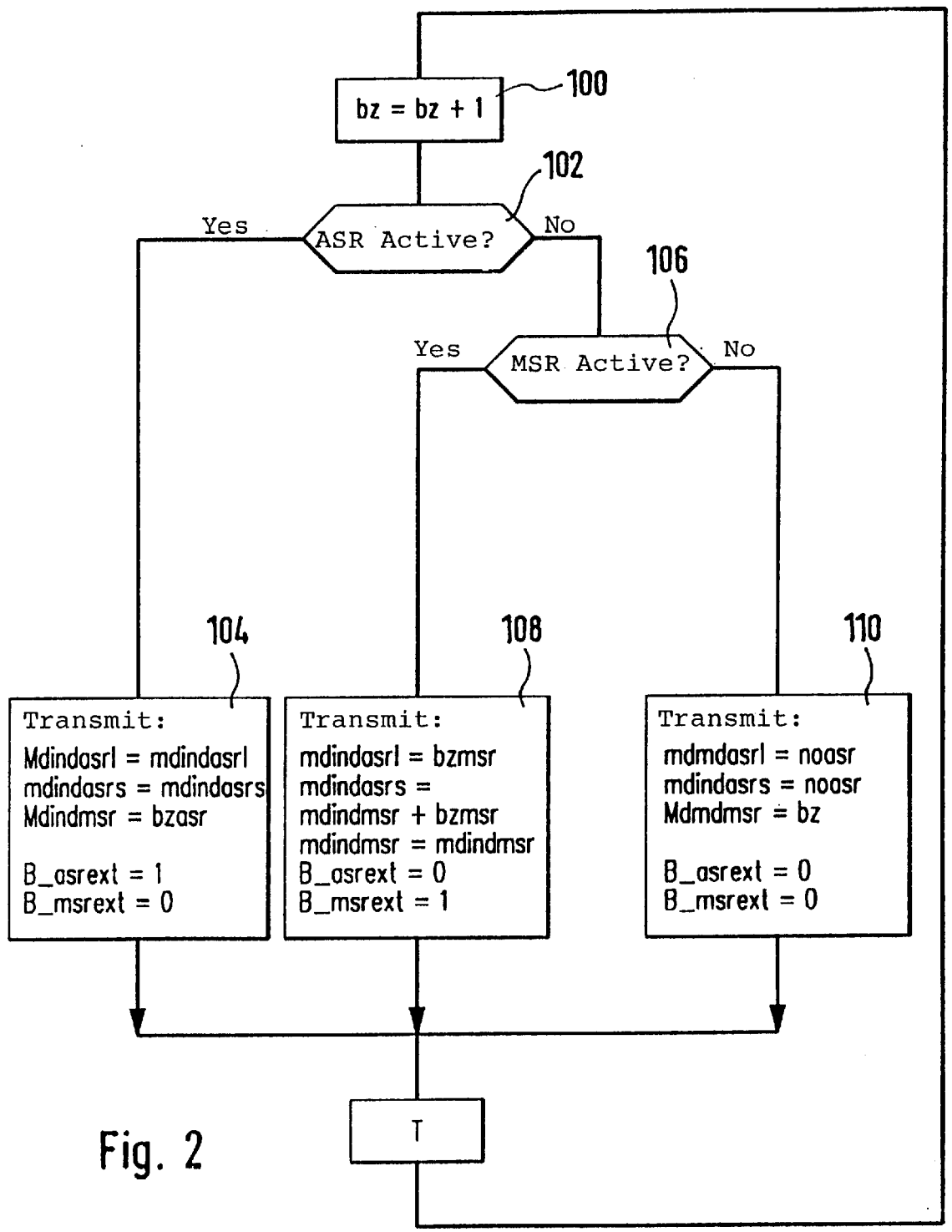
FIG. 2 is a flowchart defining a program of a microcomputer which is arranged in the transmitting control unit.

In FIG. 2, a flowchart is shown which defines a program of a microcomputer of the transmitting control unit 20. The program forms the message count and transmits the corresponding data to the control unit 10. The program is run through in pregiven time segments, for example, 10, 20 or 40 milliseconds. In the first step 100, the message count bz is incremented.

Thereafter, in step 102, a check is made as to whether the drive-slip control is active (the drive-slip control is active from the first occurrence of a slip to the disappearance of the slip without intervention). If this is the case, then, according to step 104, the corresponding input value mdindasrl is transmitted in the message of the air-end desired torque value mdindasrl. This input value mdindasrl is computed in the context of the drive-slip control.

The desired torque value mdindasrs is transmitted in the message mdindasrs of another intervention path. The message count bz in this case applies as a message count of the drive-slip control bzasr. The message count bz is transmitted in the context of the message mdindmsr in which the desired torque value for the motor drag torque control is transmitted for active motor drag torque control. Furthermore, a bit B_asrext and a corresponding bit B_msrext are transmitted. The bit B_asrext indicates the active drive-slip control and the bit B_msrext indicates the status of the motor drag torque control. The ASR bit is 1 and the MSR bit is 0. Accordingly, the program is again carried out at the next time point.

If, in step 102, it is determined that the drive-slip control is not active, then a check is made in step 106 as to whether the motor drag torque control is active (the motor drag torque control is active from the first-time occurrence of a slippage up to the disappearance of the slippage without intervention). If this is the case, then the individual messages are assigned the values in accordance with step 108 as presented below. In the message mdindasrl, the message count bz is transmitted as message count for the MSR bzmsr. In the message mdindasrs, the complement of the desired torque value mdindmsr added to the message count is transmitted. In the message mdindmsr, the desired torque value mdindmsr is transmitted which the motor drag torque control has computed. The ASR bit is 0 and the MSR bit is 1.

If the MSR case is not present either, then, according to step 110, a desired torque value noasr is transmitted in the context of the messages mdindasrl and mdindasrs. The desired torque value noasr corresponds to a non-active drive-slip control. The message count bz is transmitted in the message mdindmsr. The ASR bit is 0 and the MSR bit is likewise 0.

The corresponding data are transmitted in corresponding messages from the control unit 20 to the control unit 10. The messages are stored in the microcomputer of control unit 10 in specific cells and are checked in the context of a monitoring described below. If a fault is detected, then, after an elapse of a fault tolerance time, a corresponding identifier is set. If the data are in order, the particular intervention is enabled, otherwise, the MSR desired torque value is set to 0 or the ASR desired value is set to a very large value. The actuality of the message is checked by the message count which is incremented by the transmitting control unit. If the message count is incremented by the transmitting control unit (for example, every 10 milliseconds), then the old and the new message count must differ by at least 3 and at most 5 when there is a 40 millisecond long check cycle.

If the message count is incremented every 20 milliseconds by the transmitting control unit, then the old and the new message count must differ by at least 1 and at most 3. When recognizing any defective actualization (old and new message counts do not differ from each other), then a reversible fault is set. In addition, the message is checked as to plausibility and consistency. For this purpose, with an ASR-active message, the corresponding MSR message has to be inactive and, for an MSR-active message, the ASR message must be inactive. Furthermore, to ensure value reliability of the MSR torque command in the context of the ASR torque input, the complement of the MSR input is added to the message count and transmitted. If both functions are inactive, the two torque inputs must exhibit the corresponding inactive values noasr for the ASR operation.

Figure 3:
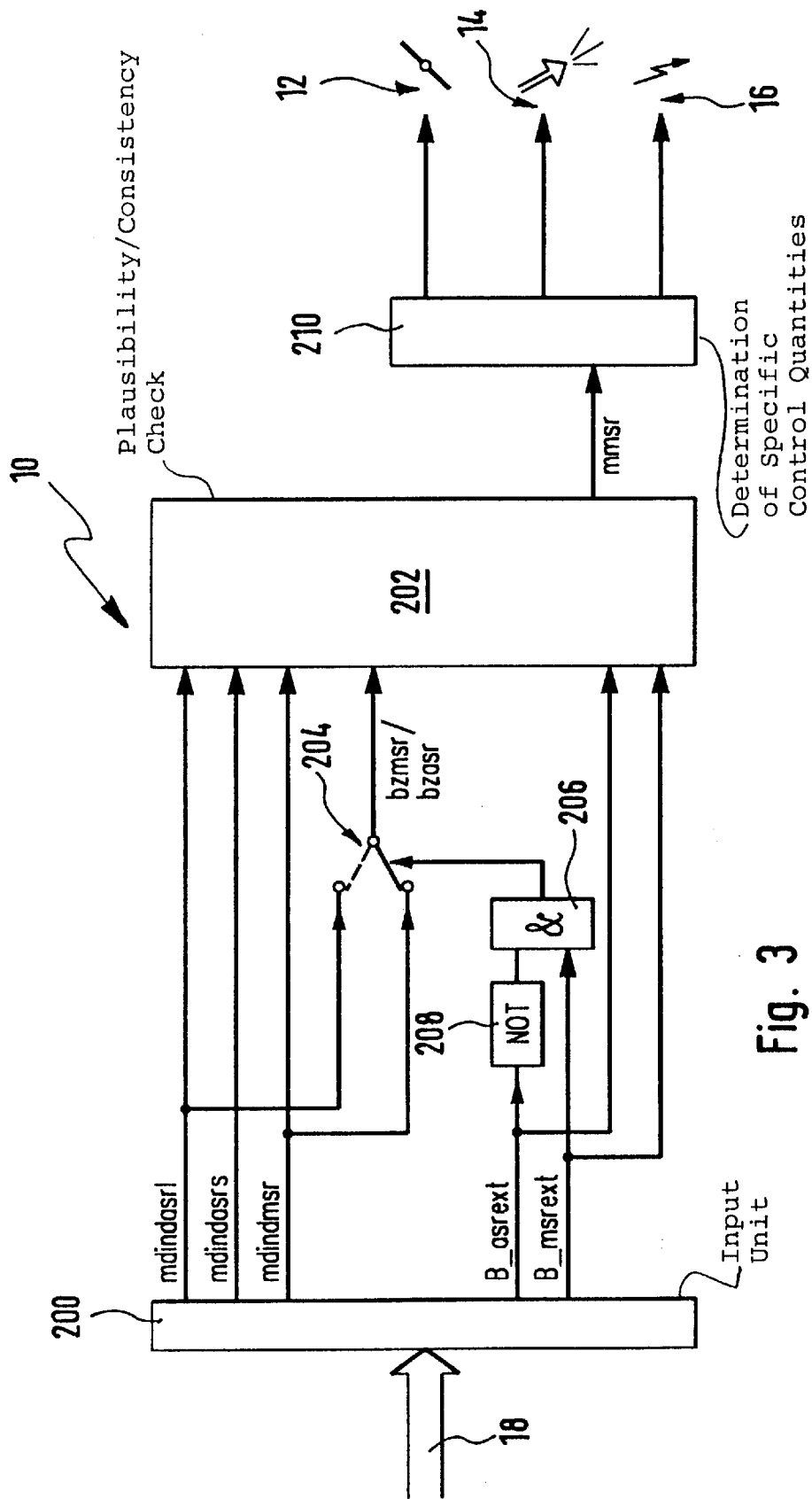
FIG. 3 is a sequence diagram showing a program of the microcomputer which is arranged in the receiving control unit; and, FIG. 4 shows an embodiment of a specific procedure for checking the transmitted desired torque values in the context of an example of an interface for drive-slip control and motor drag torque control.
Figure 4:
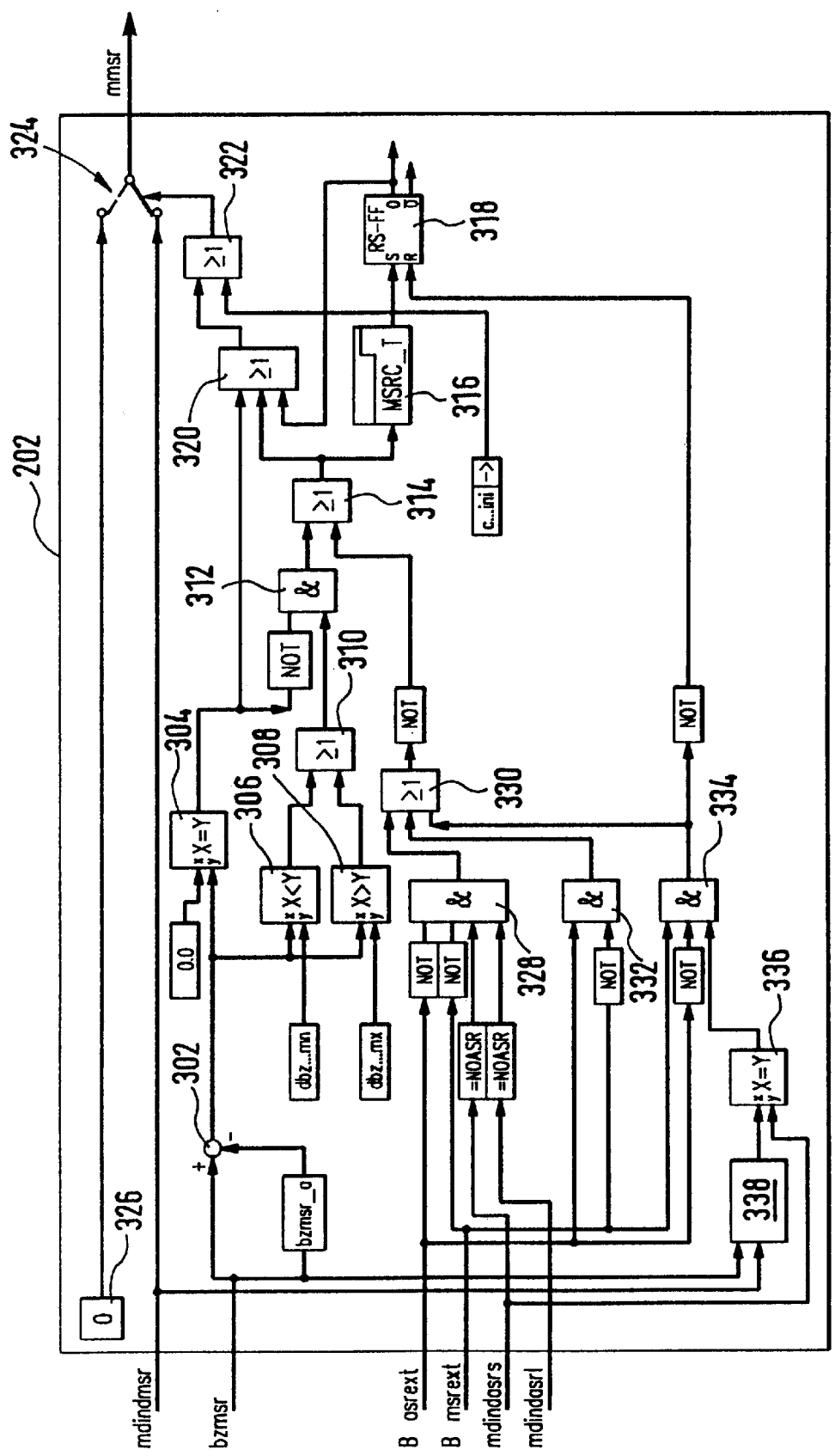

A preferred embodiment for carrying out this procedure is shown in FIGS. 3 and 4. FIG. 3 shows an input unit 200 to which the communication bus 18 is connected. The input unit 200 includes memory cells in which the messages, which are transmitted via the bus 18, are stored. The plausibility check and consistency check take place in block 202 and are explained with respect to FIG. 4.

The messages mdindasrl, mdindasrs, mdindmsr, B_asrext and B_msrext are read out from the input circuit 200 and are made available to the block 202 (plausibility/ consistency check). Furthermore, a switching element 204 is provided which switches between the shown position into the position shown in phantom outline under specific conditions. This condition is checked by the AND logic element 206. The active message of the MSR B_msrext and the active message for the ASR B_asrext (inverted in block 208) are supplied to the AND logic element 206. If the MSR is active and the ASR is not active, then the AND logic element 206 outputs a signal which switches the switch element 204 over into the position shown in phantom outline. This means that the message count bzmsr is transmitted for the MSR case via the message mdindasrl and is evaluated by block 202. If the MSR is not active or both functions are not active, then the AND logic element 206 outputs a signal which causes the switch element 204 to assume the position shown by the solid line. In this case, the message count bzasr is transmitted via the MSR input message mdindmsr and is made available to block 202. After the plausibility and consistency check of the transmitted messages, at least the desired torque value mmsr for the MSR intervention (and correspondingly, the desired torque value for the ASR intervention masr) is transmitted. In a manner known per se, the specific control quantities for the air supply, the fuel injection and/or the ignition angle are determined in block 210 from the transmitted input torques.

The procedure for the plausibility check and the consistency check is presented in FIG. 4 with respect to the example of the MSR intervention. In another embodiment, a corresponding procedure is provided also for the ASR intervention.

The quantities, which are shown in FIG. 3, namely, mdindmsr, bzmsr, B_asrext, B_msrext, mdindasrs and mdindasrl are supplied to the plausibility/consistency control 202. The transmitted message count is intermediately stored in a memory 300 for the actuality check. The message count, which is stored in the memory 300, corresponds to the old message count bzmsr_a which is stored from the last passthrough of the program shown in FIG. 4. This message count is subtracted in block 302 from the actual message count bzmsr.

In the comparison function 304, the difference of bzmsr_a and bzmsr is compared to the value 0 and, in the comparison function 306, this difference is compared to a minimum value dbzmn and, in the comparison function 308, this difference is compared to a maximum value dbzmx. If the difference of the message count drops below the minimum value or if it exceeds the maximum value (OR connection 310), then a positive signal is applied to the AND connection 312. If the message count difference is not equal to 0, then a positive signal is outputted from the AND connection 312 because of the inverted signal of the comparison function 304. This positive signal leads via the OR connection 314 to the setting of the fault counter 316. After the fault time has elapsed, an irreversible fault memory 318 is set which can be reset only during the initialization (initialization pulse C_ini, see R input). Furthermore, the switch element 324 is switched into the position shown in phantom outline by the above-mentioned signal via the OR connection 320 and the OR connection 322. In this case, the value 0, which is stored in 326, is outputted as a desired input value mmsr. This is the case because a defective actualization was detected because the threshold values were exceeded by the message count. In this case, the desired torque value mdindmsr is not transmitted further as desired value mmsr as in the case where no fault is present as shown by the solid line position of the switch element 324.

A second check takes place in the AND connection 328. There, no signal is outputted when an active message of the ASR, an active message of the MSR or one of the transmitted ASR desired torque messages mdindasrs and mdindasrl have not assumed the provided value noasr for this case. A signal is supplied inverted (as positive signal) via the OR connection 330 to the OR connection 314. The fault memory is set after elapse of the fault time because of this signal and the switch element 324 is controlled into the position shown by the broken line when at least one of the pregiven four conditions is not satisfied (namely, B_asrext=0, B_msrext=0, mdindasrs=noasr and mdindasrl=noasr).

A further check is made via the AND connection 332. Here, a check is made as to whether the ASR control is active. The AND connection 322 outputs a positive signal when the active message is present for the ASR control while the active message for the MSR control is not present. In this case (the case characterized by fault-free operation), no switchover or setting of the fault memory is made; whereas, for an omission of one of these conditions, the fault memory is set after the elapse of the fault time (via 330, 314) and the switch element 324 (via 320, 322) is switched over.

A further check takes place in the AND connection 334. In a corresponding manner, the active messages for ASR and MSR (the last one inverted) are supplied to the AND connection 332. Furthermore, a signal of the comparison operation 336 is supplied to the AND connection 332. This connection 332 checks as to whether the values at its inputs are the same. The one input is determined by the content of the message mdindasrs; whereas, the other is charged with the output signal of the complement formation 338. The complement formation 338 forms the complement of the sum of the desired torque value mdindmsr and the message count bzmsr which is transmitted from the other control apparatus in this operating state in active MSR via the message mdindasrs. If the two values are the same, a signal is outputted which, in combination with the two other signals (B_asrext=0, B_msrext=1), leads to a signal characterizing the fault-free operation. Neither the fault memory is set nor is the switch element 324 switched over. If one of the two conditions of the AND connection 334 is not satisfied, then the fault memory is set and the switch element 324 is switched over directly via the OR connection 322 (or via 320, 322). The last-mentioned action takes place also when the fault memory 318 is set.

In the manner described, the message count, which is transmitted in the manner according to the invention for actuality check and for consistency check, is evaluated in combination with an MSR intervention. Corresponding measures are undertaken in combination with the ASR intervention.

At least one of the two messages or both messages serve in other embodiments not for transmitting desired values but for transmitting other operating variables such as measurement variables or actual values.

It is understood that the foregoing description is that of the preferred embodiments of the invention and that various changes and modifications may be made thereto without departing from the spirit and scope of the invention as defined in the appended claims.

What is claimed is:

1. A method fox transmitting data in a motor vehicle having at least one control unit which transmits pieces of data in the context of messages, the method comprising the steps of:

causing said control unit to transmit a first message containing a first piece of data in the form of a first operating variable and a second message containing a second piece of data in the form of a second operating variable not present simultaneously with said first operating variable; and, causing said control unit to transmit a third piece of data in the context of the message of that one of said operating variables which is not present.

2. The method of claim 1, wherein said two operating variables are at least one of the desired values and actual values.

3. The method of claim 2, wherein a first one of said desired values is a desired value for the motor torque in the context of a drive-slip control; and, a second one of said desired values is a desired value for the motor torque for carrying out a motor drag torque control.

4. The method of claim 3, wherein said third piece of data is a message count formed in said control unit.

5. The method of claim 1, wherein said third piece of data is a value derived from one of said operating variables.

6. The method of claim 4, wherein said control unit transmits a desired value for torque for carrying out the drive-slip control when said drive-slip control is active; and, said control unit transmits said message count in the message for said desired value for carrying out a motor drag torque control.

7. The method of claim 1, wherein additional data are transmitted which indicate the particular active operating state.

8. The method of claim 4, wherein said one control unit is a transmitting control unit and said motor vehicle includes a receiving control unit; and, wherein said receiving control unit determines a message count and a desired value by evaluating transmitted data which indicate the particular operating state.

9. The method of claim 8, wherein, for the case of a drive-slip control, at least one of the following are transmitted: a desired value for the air adjustment, a desired value for the ignition setting and a desired value for the fuel-metering setting; and, wherein said message count is transmitted in the context of said desired value for the air setting when the motor drag torque control is active.

10. The method of claim 4, wherein said message count is transmitted in the context of the desired torque value for the motor drag torque control when both the motor drag torque control and the drive-slip control are inactive.

11. The method of claim 9, wherein said receiving unit compares the determined message count to limit values.

12. The method of claim 5, wherein a test value is transmitted in the context of at least a message for the desired value for the drive-slip control when the motor drag torque control is active, said test value being formed from said message count and said desired value for the motor drag torque control; wherein said test value is compared to a correspondingly formed test value by said receiving control unit to determine the consistency of the transmitted desired value.

13. A method for transmitting data in a motor vehicle having at least one control unit which receives pieces of information in the context of messages, the method comprising the steps of:

causing said control unit to receive a first message containing a first piece of data in the form of a first operating variable and a second message containing a second piece of data in the form of a second operating variable not present simultaneously with said first operating variable; and, causing said control unit to receive a third piece of data in the context of the message of that one of said operating variables which is not present.

14. The method of claim 13, wherein said two operating variables are at least one of the desired values and actual values.

15. The method of claim 14, wherein a first one of said desired values is a desired value for the motor torque in the context of a drive-slip control; and, a second one of said desired values is a desired value for the motor torque for carrying out a motor drag torque control.

16. The method of claim 15, wherein said third piece of data is a message count formed in said control unit.

17. The method of claim 13, wherein said third piece of data is a value derived from one of said operating variables.

18. The method of claim 16, wherein said control unit transmits a desired value for torque for carrying out the drive-slip control when said drive-slip control is active; and, said control unit transmits said message count in the message for said desired value for carrying out a motor drag torque control.

19. The method of claim 13, wherein said third piece of data is transmitted which indicate the particular active operating state.

20. The method of claim 16, wherein said one control unit is a transmitting control unit and said motor vehicle includes a receiving control unit; and, wherein said receiving control unit determines a message count and a desired value by evaluating transmitted data which indicate the particular operating state.

21. The method of claim 20, wherein, for the case of a drive-slip control, at least one of the following are transmitted: a desired value for the air adjustment, a desired value for the ignition setting and a desired value for the fuel-metering setting; and, wherein said message count is transmitted in the context of said desired value for the air setting when the motor drag torque control is active.

22. The method of claim 16, wherein said message count is transmitted in the context of the desired torque value for the motor drag torque control when both the motor drag torque control and the drive-slip control are inactive.

23. The method of claim 21, wherein said receiving unit compares the determined message count to limit values.

24. The method of claim 17, wherein a test value is transmitted in the context of at least a message for the desired value for the drive-slip control when the motor drag torque control is active, said test value being formed from said message count and said desired value for the motor drag torque control; wherein said test value is compared to a correspondingly compared test value by said receiving control unit to determine the consistency of the transmitted desired value.

25. An arrangement for transmitting data in a motor vehicle, the arrangement comprising:

a control unit for transmitting pieces of data in the context of messages and said control unit including means for transmitting a first message containing a first operating variable and a second message containing a second operating variable not present simultaneously with said first operating variable; and, said control unit including means for transmitting a third piece of data in the context of the message of that one of said operating variables which is not present.

26. An arrangement for transmitting data in a motor vehicle, the arrangement comprising:

a control unit for receiving pieces of data in the context of messages and said control unit including means receiving a first message containing a first operating variable and a second message containing a second operating variable not present simultaneously with said first operating variable; and, said control unit including means for receiving a third piece of data in the context of the message of that one of said operating variables which is not present.

* * * * *